United States Patent [19]

Limbacher et al.

[11] Patent Number: 4,909,370
[45] Date of Patent: Mar. 20, 1990

[54] PULLED-TYPE MOTOR VEHICLE CLUTCH

[75] Inventors: Bernhard Limbacher, Niederwerrn; Karl Müller, Kronungen; Nikolaus Rudolph, Forst; Herbert Voit, Schweinfurt, all of Fed. Rep. of Germany

[73] Assignee: Fichtel & Sachs AG, Schweinfurt, Fed. Rep. of Germany

[21] Appl. No.: 269,477

[22] Filed: Nov. 9, 1988

[30] Foreign Application Priority Data

Nov. 27, 1987 [DE] Fed. Rep. of Germany ....... 3740237

[51] Int. Cl.$^4$ .............................................. F16D 23/14
[52] U.S. Cl. .................................. 192/98; 192/110 B; 192/DIG. 1; 24/546; 403/326; 411/353; 411/517
[58] Field of Search ................... 192/70.27, 98, 110 B, 192/DIG. 1; 24/27, 20 TT, 546; 403/326, DIG. 7; 411/352, 353, 517, 530

[56] References Cited

U.S. PATENT DOCUMENTS 1,048,983 12/1912 Madden ........................ 403/326 X
3,805,337 4/1974 Branstetter ......................... 24/27
4,099,298 7/1978 Giminez ............................. 24/27
4,664,241 5/1987 Renaud et al. .................... 192/98
4,782,935 11/1988 Gay et al. .......................... 192/98
4,809,835 3/1989 Ziegler et al. ................. 192/98 X

FOREIGN PATENT DOCUMENTS 3537788 4/1987 Fed. Rep. of Germany .
3632884 3/1988 Fed. Rep. of Germany .
1055329 2/1954 France .............................. 24/27
442604 2/1936 United Kingdom .
481970 3/1938 United Kingdom .
793168 4/1958 United Kingdom .

Primary Examiner—Randolph A. Reese
Assistant Examiner—John A. Ricci
Attorney, Agent, or Firm—Brumbaugh, Graves, Donohue & Raymond

[57] ABSTRACT

A pulled-type motor vehicle clutch to be used between a combustion engine and a gear box comprises a clutch release ring, axial movement of which results in releasing or opening the clutch. A clutch release sleeve is insertable into the clutch release ring and is connectable to the clutch release ring by a wire clip. The wire clip has a circular basic wire ring and two end portions. The wire ring extends over nearly 360°. A gap is defined between the ends of the circular basic wire ring. The end portions are adjoined to the ends of the circular basic wire ring. These end portions can be engaged by hand or by a tool for widening the circular basic wire ring. The end portions cross each other. The gripping faces are directed in opposite circumferential directions away from each other such that mutually approaching said gripping faces results in widening the circular basic wire ring. By widening the circular basic wire ring the connection between the clutch release ring and the clutch release sleeve is interrupted.

13 Claims, 3 Drawing Sheets

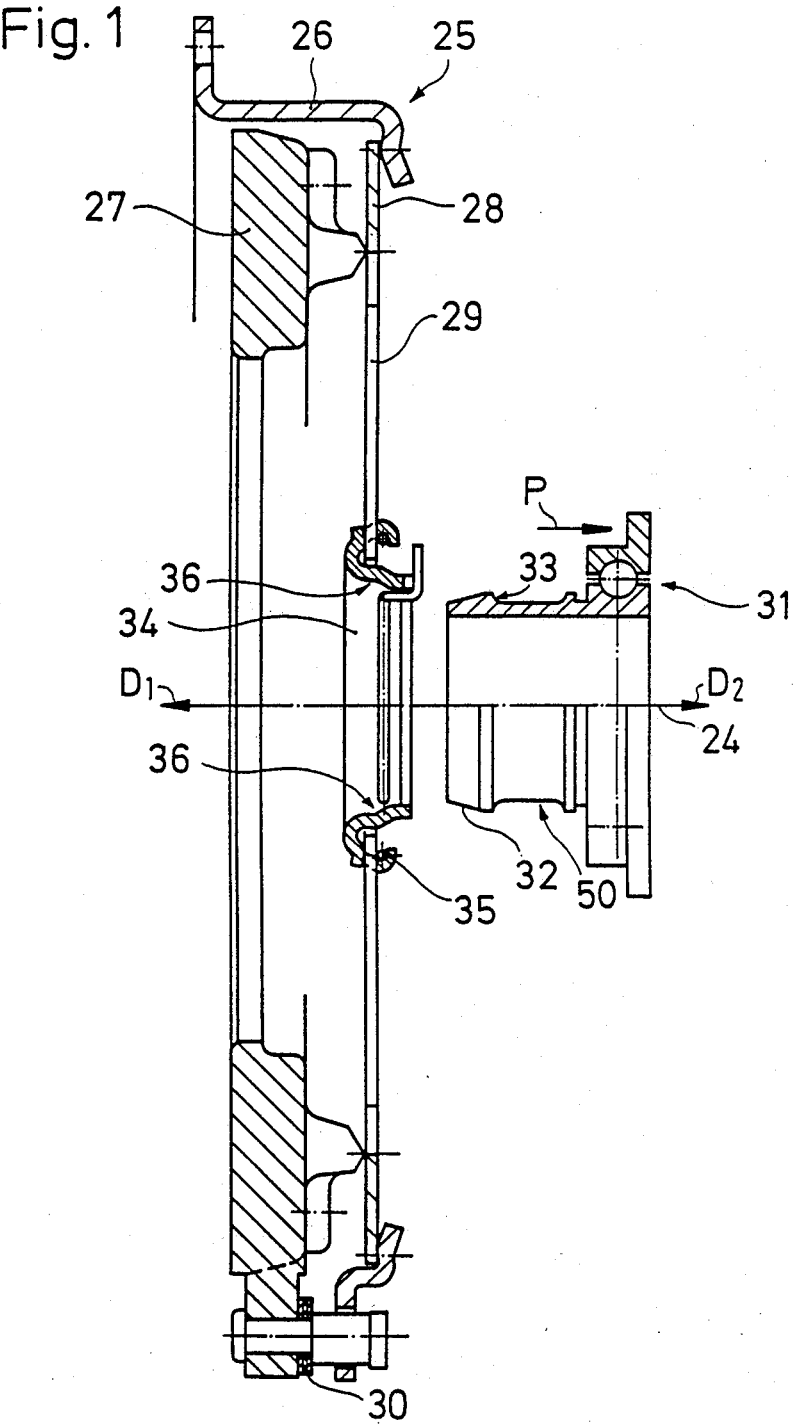

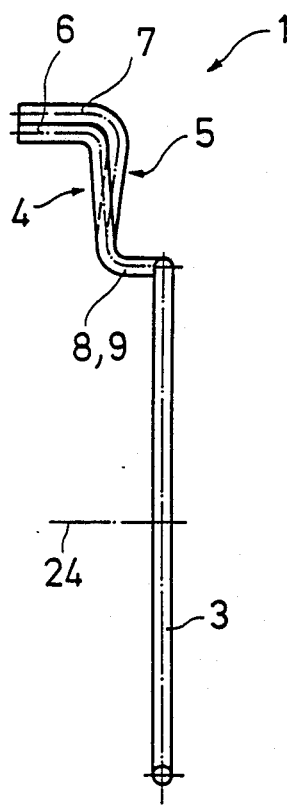
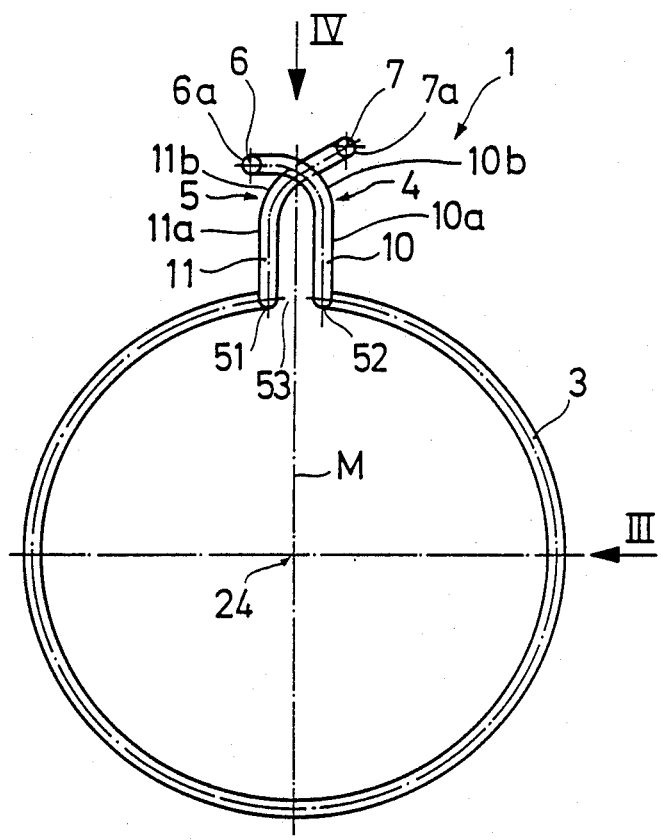
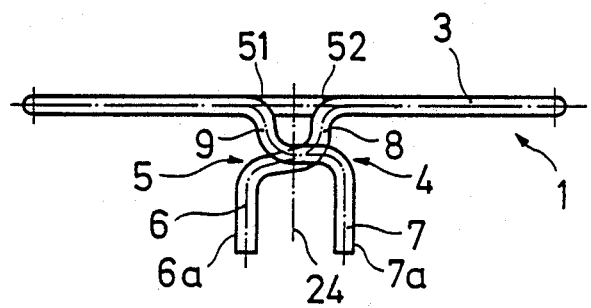

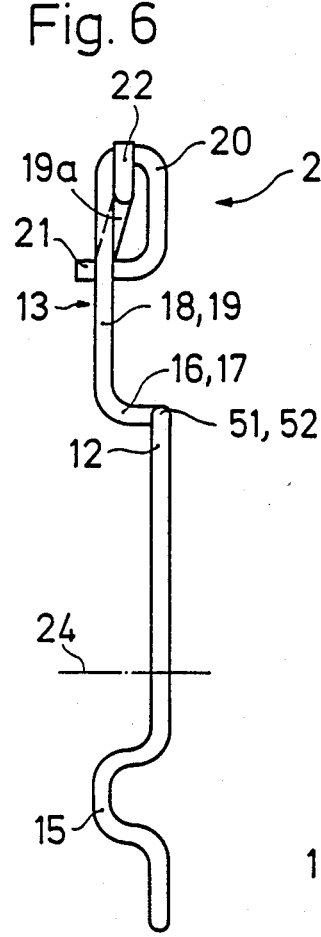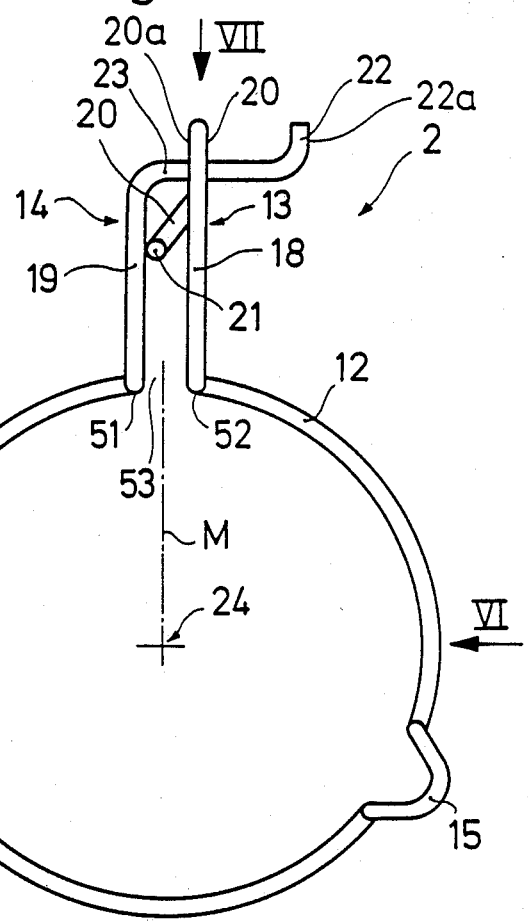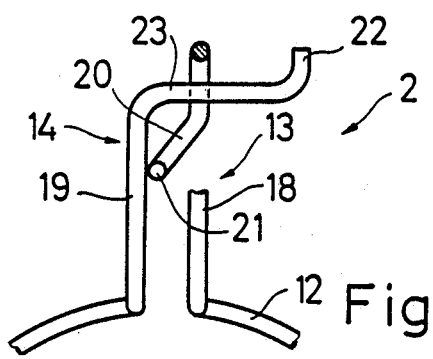

PULLED-TYPE MOTOR VEHICLE CLUTCH

BACKGROUND OF THE INVENTION

In pulled-type motor vehicle clutches a clutch release sleeve is inserted into a clutch release ring. The clutch release ring is rotatable with the clutch housing. The clutch release sleeve is rotatably mounted on a clutch release fork so that by axial movement of the clutch release fork the clutch release ring can be moved in axial direction and the clutch can be released or opened. For connecting the clutch release ring with the clutch release sleeve a spring clip is used. This spring clip becomes effective automatically when the clutch release sleeve is inserted into the clutch release ring. If it is necessary, however, to separate the clutch release ring and the clutch release sleeve from each other, a separating tool must be applied to the spring clip.

STATEMENT OF THE PRIOR ART

From German Offenlegungsschrift No. 35 37 788 a spring clip has been known in which the ends of the spring clip must be removed from each other by the separating tool when it is intended to separate the clutch release ring and the clutch release sleeve. The separating operation is therefore relatively complicated, particularly in consideration of the unfavorable accessibility of the spring clip within a connection housing interconnecting the combustion engine and the gear box. Moreover, a complicated tool is necessary for removing the ends of the spring clip from each other.

OBJECT OF THE INVENTION

It is a primary object of the present invention to provide a clutch unit in which the separating of the clutch release ring and the clutch release sleeve is facilitated and a simplified separating tool may be used for performing the separation.

SUMMARY OF THE INVENTION

A clutch unit, particularly for use in a power transmission between a motor and a gear box, has an axis defining a first axial direction (towards the motor) and a second axial direction (towards the gear box). The clutch unit comprises a clutch release ring member surrounding the axis. The clutch release ring member is mounted for common rotation with the clutch unit and is axially movable along the axis. By axial movement of the clutch release ring member in said second axial direction the clutch unit may be opened or released. For performing such axial movement a clutch release sleeve member surrounding the axis is inserted into the clutch release ring member. The clutch release ring member has a first annular shoulder substantially directed in said first axial direction, and the clutch release sleeve member has a second annular shoulder substantially directed in said second axial direction. The clutch release ring member and the clutch release sleeve member are interconnected for common axial movement in the second axial direction by a wire clip unit. The wire clip unit has a circular basic wire ring and two end portions. The wire ring extends over an angle about said axis of nearly 360°. A gap is defined between the ends of the circular basic wire ring. The end portions adjoin the ends of the circular basic wire ring and are located radially outwards of the circular basic wire ring. The circular basic wire ring engages both the first annular shoulder and the second annular shoulder such that the clutch release ring member is coupled for common axial movement with said clutch release sleeve member in the second axial direction. The end portions provide gripping faces permitting widening of the circular basic wire ring such as to disengage the circular basic wire ring from the second annular shoulder and to permit withdrawal of the clutch release sleeve member from the clutch release ring member in the second axial direction. In view of the above object, the end portions—when regarded in an axial direction—cross each other. The gripping faces are directed in opposite circumferential directions about the axis away from each other such that mutually approaching the gripping faces substantially along a tangent with respect to the axis results in widening said circular basic wire ring.

With this construction of the spring clip unit the widening of the circular basic wire ring can be performed by use of simple combination pliers.

In order to prevent the spring clip unit from expanding by centrifugal forces on occurrence of high rotational speeds the circular basic wire ring can be prestressed in radial inward direction towards the clutch release sleeve member. In such case one can limit narrowing of said circular basic wire ring by said prestress in the dismantled condition of the spring clip unit by providing mutually engaging abutment faces of the end portions. Such limitation of the narrowing of the circular basic wire ring facilitates the insertion of the clutch release sleeve member into the clutch release ring and the spring clip unit.

Clutch units of the present type are frequently provided with membrane springs to the inner diameter of which the clutch release ring members are fixed by engagement with radial inner ends of respective radially inwardly directed spring tongues. It is desirable to provide the end portions of the spring clip unit on the side of the membrane spring which is directed in the second axial direction, i.e. towards the gear box. In order to insert the circular wire ring into the clutch release ring member and bring it in radial alignment with the first annular shoulder while leaving the end portions outside the end of the clutch release ring member, which is directed in said second axial direction, it is proposed that the end portions are axially offset in said second axial direction with respect to a plane defined by the circular basic wire ring. This can be obtained in that the end portions comprise root sections which adjoin the ends of the circular basic wire ring and extend in substantially axial direction.

In accordance with a first embodiment of the invention the end portions comprise main sections crossing each other according to an X-configuration when regarded in an axial direction. More particularly these main sections—when regarded in an axial direction—may be provided with radially inner partial sections substantially parallel to a middle plane of said gap containing said axis, and curved radially outer partial sections crossing each other.

In view of the crossing relationship of the end portions. one can shape the main sections such that—when regarded in a tangential direction adjacent to said gap—the main sections diverge in radially outward direction.

In order to provide easily engageable gripping faces, the main portions may be provided at their radially outer ends with substantially axially directed terminal portions, said terminal portions providing said gripping faces.

In order to prevent an overtensioning of the spring clip unit and to stabilize the spring clip unit between the engagement faces of combination pliers, it is provided that the terminal portions are located in different radial distances from the axis such that the terminal portions are positionable one above the other in radial direction when the terminal portions are approached for widening said circular basic wire ring.

According to a second embodiment of the invention one of the end portion has—when regarded in an axial direction—a substantially L-shaped configuration with a first L-leg extending substantially parallel to a middle plane of the gap containing said axis, and a second L-leg adjoining a radially outward end of the first L-leg and extending substantially perpendicular to the middle plane. A terminal leg substantially parallel to the middle plane is provided at the end of the second L-leg which is remote from the first L-leg. The other end portion has—when regarded in an axial direction—a main leg extending substantially parallel to said middle plane. A loop is provided at a radially outer end of the main leg. The second L-leg extends through this loop. The gripping faces are provided by the loop and by the terminal leg. So in this embodiment an overtensioning is prohibited by said terminal leg being engaged with the loop.

In this embodiment the limitation of narrowing under prestress can be effected in that the loop has a terminal loop section, and that the first L-leg and the terminal loop section provide engagement faces limiting prestress caused narrowing of the circular basic ring.

In order to facilitate the assembling of the clutch release ring member and the clutch release sleeve member, at least one of the clutch release ring member and the spring clip unit may be provided with abutment means for positioning the wire clip unit with respect to the clutch release ring member before inserting said clutch release sleeve member into the clutch release ring member.

The assembling of the clutch release ring member and the clutch release sleeve member may further be facilitated by providing the clutch release sleeve member with a conical introduction face widening the circular wire ring when introducing the clutch release sleeve member into the clutch release ring member. Such the assembling may be performed in simply pushing the clutch release sleeve member through the circular wire ring into the clutch release ring member. This is particularly true if the smaller end of the conical introduction face is smaller or equal in diameter as compared with the inner diameter of said circular basic wire ring before said clutch release sleeve member is introduced into said circular basic wire ring.

The abutment means may have the form as disclosed in German Offenlegungsschrift No. 36 32 884. Alternatively, the abutment means may be established by cranked sections of said circular basic wire ring which are distributed around the circumference thereof and are engageable with end faces of said clutch release ring member, which end faces are directed in said second axial direction.

This invention further provides a wire spring clip unit usable in connection with a clutch unit of this invention.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to the embodiments shown in the accompanying drawings, in which:

FIG. 1 shows a longitudinal section through a clutch unit of the present invention;

FIG. 2 shows an axial view of a wire spring clip unit;

FIG. 3 shows the wire spring clip unit of FIG. 2 as regarded in direction III of FIG. 2;

FIG. 4 shows a plan view of the wire spring clip unit of FIG. 2 when regarded in a direction IV of FIG. 2;

FIG. 5 shows a second embodiment of the wire spring clip unit when regarded in axial direction;

FIG. 5a shows a partial view similar to FIG. 5 with a part thereof broken away;

FIG. 6 shows a side view with regard to FIG. 5 when regarded in direction VI of FIG. 5; and FIG. 7 shows a plan view with respect to FIG. 5 when regarded in the direction VII of FIG. 5.

DESCRIPTION OF THE PREFERRED EMBODIMENTS

FIG. 1 shows the overall situation. A thrust plate unit 25 of a motor vehicle friction clutch consists of a clutch cover 26 and a presser plate 27 arranged therein. The presser plate 27 is mounted fast in rotation—but axially displaceably—in the clutch cover 26 through tangential leaf springs 30. Between the clutch cover 26 and the presser plate 27 a diaphragm spring 28 is arranged which resiliently loads the presser plate 27 contrarily of the direction of the arrow P. The radially inwardly pointing spring tongues 29 of the diaphragm spring 28 engage in a clutch release ring member shaped as a sheet metal ring 34 which is held in the illustrated position by a securing ring 35. The axis of the thrust plate 25 is designated by 24. A first arrow $D_1$ is directed towards the combustion engine and a second arrow $D_2$ is directed towards the gear box. A wire spring clip unit 1 is arranged in the sheet metal ring 34. A release unit 31, which is represented in a position before being brought into its working position, consists of a roller bearing with an outer race, roller bodies and an inner race, the inner race being part of a clutch release sleeve member 50. The clutch release sleeve member 50 has a taper 32 which narrows in the direction $D_1$. On its rear the taper 32 has a shoulder 33 for a circular basic wire ring of the wire spring clip unit 1. A similar shoulder 36 is also arranged in the sheet metal ring 34. The entire arrangement with the exception of the outer race of the releaser unit 31 is arranged rotatably about the common axis 24 of rotation. For the fitting of the entire system the gear box (not shown) with the overall clutch cover and the releaser unit 31 arranged therein is pushed axially in the direction $D_1$ towards the internal combustion engine, so that the taper 32 of the clutch release sleeve unit 50 threads itself into the wire spring clip unit 1, and expands the latter elastically until it snaps behind the shoulder 33. The wire spring clip unit I is meanwhile axially supported in the sheet metal ring 34 by axial abutment means (not shown). After the snapping behind the shoulder 33 the system is in a position to transmit the release forces in the direction of the arrow P by way of the two shoulders 33 and 36 and the wire ring, the shoulder 36 being shaped within the sheet metal ring 34. For the separation of the system the releaser unit 31 is pushed in somewhat in the direction $D_1$ towards the thrust plate 25. Hereupon, the wire spring clip unit 1 is somewhat expanded by an expansion tool or separating tool in diameter, and then the clutch release sleeve member 50 is moved apart in the direction of the arrow $D_2$.

In FIGS. 2 to 4 there is reproduced an advantageous possible embodiment of a spring clip unit 1. The spring clip unit 1 as illustrated has a basic wire ring 3, which forms almost a complete circle, presuming that axial supporting is provided during the fitting operation, as described by way of example in German Offenlegungsschrift No. 36 32 884. In its form as illustrated the circular basic wire ring 3 has a diameter as necessary for introducing the tapered face 32 as shown in FIG. 1. The two ends 51 and 52 of the circular basic wire ring 3 are separated by a gap 53. Root sections 8 and 9 of end portions 4 and 5 adjoin the ends 52 and 51, respectively, such that the main sections 10 and 11 of the end portions 4 and 5, respectively, are axially offset with respect to the plane defined by the basic circular wire ring 3. The radially inner partial sections 10a and 11a of the main sections extend, in the view according to FIG. 2, at least over a major range, substantially parallel with one another and with a middle plane 4 of the gap 53, which middle plane contains the axis 24. In the lateral view according to FIG. 3, however, it can be seen that the main sections 10 and 11 diverge radially outwards and deviate each in the one or the other direction from a plane parallel to the plane of the circular basic wire ring 3. At the radially outer ends of the main sections 10 and 11 the radially outer partial sections 10b and 11b cross over one another and each terminates in an axially extending terminal portion 6 and 7, respectively. These terminal portions 6 and 7 again extend parallel with one another, namely at different radial distances from the common axis 24 of rotation. The difference in distance must be at least as great as the diameter of the terminal portions itself. In the elevation according to FIG. 2 and in the plan view according to FIG. 4 it may be seen that the two terminal portions 6 and 7 have a predetermined circumferential spacing from one another about the axis 24, which spacing determines the amount of the possible widening of the circular basic ring member 3 and the amount of the stressing thereof as a result of such widening. By way of example with a pair of multi-purpose pliers it is readily possible to press the terminal portions 6 and 7 together, so that they come to lie directly radially one over the other. Thus the basic circular ring member 3 is expanded and brought to a larger mean diameter. This renders possible withdrawal of the clutch release member 50 from the snap connection. The gripping faces to which the pliers are applied are designated in FIGS. 2 and 4 by 6a and 7a.

In FIGS. 5 to 7 there is reproduced a further advantageous possible embodiment of a wire ring clip unit 2. This wire ring clip unit 2 comprises in the region of the circular basic wire ring 12 two cranks 15 which serve in accordance with the prior art—German Offenlegungsschrift No. 35 37 788 —together with the two radially protruding end portions 13 and 14 to produce an axial supporting in relation to the clutch release ring member which is also in this embodiment a sheet metal ring 34, when the combustion engine, the clutch unit and the gear box are assembled The two end portions 13 and 14 comprise again root sections 16, 17 such that the end portions 13, 14 are axially offset with respect to the middle plane of the circular basic wire ring 12. The end portion 14 comprises a first I-leg 19 and a second L-leg 23 defining a L-shaped configuration 19, 23 in a plane substantially parallel to the main plane of the circular basic wire ring. A terminal leg 22 extends from the leg 23 in substantially radially outward direction. This terminal leg 22 is also substantially parallel to the main plane of the basic circular wire ring 12.

The other end portion 13 comprises a main leg 18. Both the first L-leg 19 and the main leg 18 are substantially parallel to the middle plane M of the gap 53 which contains the axis 24. The upper portion 19a of the first L-leg 19 is bent such that the second L-leg 23 avoids the main leg 18, as seen in FIG. 6. The main leg 18 is provided with a loop 20 which is substantially in a plane parallel to the middle plane M. The second L-leg 23 passes through the loop 20. A terminal loop section 21 engages the first L-leg 19.

The loop 20 and the terminal leg 22 are provided with gripping faces 20a and 22a. By gripping these gripping faces 20a and 22a with multi-purpose pliers the gripping faces 20a and 22a can be approached to each other, while the circular basic wire ring 12 is expanded. The terminal loop section 21 engages the L-leg leg 19 in the dismantled position with prestress. So the circular basic wire ring is under prestress without being too much narrowed due to the engagement of the parts 21 and 19. So in the assembled condition the circular basic wire ring 12 engages the clutch release sleeve member 50 with prestress and is resistant against expansion effected by centrifugal force. On the other hand, the circular basic wire ring 12 has a minimal diameter which allows easy insertion of the tapered face 32. When approaching the gripping faces 20a and 22a, the maximum expansion is defined by the terminal leg 22 engaging the loop 20.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A clutch unit (25), particularly for use in a power transmission between a motor and a gear box,
said clutch unit (25) having an axis (24) defining a first axial direction ($D_1$) (towards the motor) and a second axial direction ($D_2$) (towards the gear box), and comprising a clutch release ring member (34) surrounding said axis (24), said clutch release ring member (34) being mounted for common rotation with said clutch unit (25) and being axially movable along said axis (24), axial movement of said clutch release ring member (34) in said second axial direction ($D_2$) resulting in opening of said clutch unit (25), a clutch release sleeve member (50) surrounding said axis (24) and being inserted into said clutch release ring member (34), said clutch release ring member (34) having a first annular shoulder (36) substantially directed in said first axial direction ($D_1$), and said clutch release sleeve member (50) having a second annular shoulder (33) substantially directed in said second axial direction ($D_1$), said clutch release ring member (34) and said clutch release sleeve member (50) being interconnected for common axial movement in said second axial direction (D₂) by a wire clip unit (1), said wire clip unit (1) having a circular basic wire ring (3) and two end portions (4, 5), said circular basic wire ring (32) extending over an angle about said axis (24) of nearly 360°, a gap (53) being defined between the ends (51, 52) of said circular basic wire ring (3), said end portions (4, 5) adjoining said ends (51, 52) of said circular basic wire ring (3), said circular basic wire ring (3) engaging both said first annular shoulder (36) and said second annular shoulder (33) such that said clutch release ring member (34) is coupled for common axial movement with said clutch release sleeve member (50) in said second axial direction (D₂), said circular basic wire ring (3) being prestressed in radial inward direction towards said clutch release sleeve member (50), narrowing of said circular basic wire ring (3) by said prestress in the dismantled condition of said spring wire clip unit (1) being limited by mutually engaging abutment faces of said end portions (4, 5), said end portions (4, 5) providing gripping faces (6a, 7a) permitting widening of said circular basic wire ring (3) such as to disengage said circular basic wire ring (3) from said second annular shoulder (34) and to permit withdrawal of said clutch release sleeve member (50) from said clutch release ring member (34) in said second axial direction (D₂), said end portions (4, 5)—when regarded in an axial direction (D₁, D₂)—crossing each other, said gripping faces (6a, 7a) being directed in opposite substantially circumferential direction about said axis (24) away from each other such that mutually approaching said gripping faces (6a, 7a) substantially along a tangent with respect to said axis (24) results in widening said circular basic wire ring (3).

2. A clutch unit as set forth in claim 1, said end portions (4, 5) being axially offset in said second axial direction (D₂) with respect to a plane defined by said circular basic wire ring (3).

3. A clutch unit as set forth in claim 2, said end portions (4, 5) comprising root sections (8, 9) adjoining said ends (52, 53) of said circular basic wire ring (3) and extending in substantially axial direction.

4. A clutch unit as set forth in claim 1, said end portions (4, 5) comprising main sections (10, 11) crossing each other according to an X-configuration when regarded in an axial direction (D₁, D₂).

5. A clutch unit as set forth in claim 4, said main sections (10, 11)—when regarded in an axial direction—having radially inner partial sections (10a) substantially parallel to a middle plane (M) of said gap (53) containing said axis (24), and curved radially outer partial sections (10b, 11b) crossing each 6. A clutch unit as set forth in claim 4, said sections (10, 11)—when regarded in a tangential direction adjacent to said gap (53)—diverging in radially outward 7. A clutch unit as set forth in claim 4, said main sections (10, 11) being provided at their radially outer ends with substantially axially directed terminal portions (6, 7), said terminal portions (6, 7) providing said gripping faces (6a, 7a).

8. A clutch unit as set forth in claim 7 said terminal portions (6, 7) being located in different distances from said axis (24) such that said terminal portions (7, 7) are positionable one above the other in radial direction when said terminal portions (6, 7) are approached for widening said circular basic wire ring (3).

9. A clutch unit (25), particularly for use in a power transmission between a motor and a gear box, said clutch unit (25) having an axis (24) defining a first axial direction (D₁) (towards the motor) and a second axial direction (D₂) (towards the gear box), and comprising a clutch release ring member (34) surrounding said axis (24), said clutch release ring member (34) being mounted for common rotation with said clutch unit (25) and being axially movable along said axis (24), axial movement of said clutch release ring member (34) in said second axial direction (D₂) resulting in opening of said clutch unit (25), a clutch release sleeve member (50) surrounding said axis (24) and being inserted into said clutch release ring member (34), said clutch release ring member (34) having a first annular shoulder (36) substantially directed in said first axial direction (D₁), and said clutch release sleeve member (50) having a second annular shoulder (33) substantially directed in said second axial direction (D₁), said clutch release ring member (34) and said clutch release sleeve member (50) being interconnected for common axial movement in said second axial direction (D₂) by a wire clip unit (1), said wire clip unit (1) having a circular basic wire ring (3) and two end portions (4, 5), said circular basic wire ring (3) extending over an angle about said axis (24) of nearly 360°, a gap (53) being defined between the ends (51, 52) of said circular basic wire ring (3), said end portions (4, 5) adjoining said ends (51, 52) of said circular basic wire ring (3), said circular basic wire ring (3) engaging both said first annular shoulder (36) and said second annular shoulder (33) such that said clutch release ring member (34) is coupled for common axial movement with said clutch release sleeve member (50) in said second axial direction (D₂), said end portions (4, 5) providing gripping faces (6a, 7a) permitting widening of said circular basic wire ring (3) such as to disengage said circular basic wire ring (3) from said second annular shoulder (33) and to permit withdrawal of said clutch release sleeve member (50) from said clutch release ring member (34) in said second axial direction (D₂), said end portions (4, 5)—when regarded in an axial direction (D₁, D₂)—crossing each other, said gripping faces (6a, 7a) being directed in opposite substantially circumferential direction about said axis (24) away from each other such that mutually approaching said gripping faces (6a, 7a) substantially along a tangent with respect to said axis (24) results in widening said circular basic wire ring (3) one of said en portions having—when regarded in an axial direction (D₁, D₂)—a substantially L-shaped configuration with a first L-leg (19) extending substantially parallel to a middle plane (M) of said gap (53) containing said axis (24) and a second L-leg (23) adjoining a radially outward end of said first L-leg (19) and extending substantially perpendicular to said middle plane (M), a terminal leg (22) substantially parallel to said middle plane (M) being provided at the end of said second L-leg (23) which is remote from said first L-leg (19), the other one (13) of said end portions (13, 14) having—when regarded in an axial direction (D₁, D₂)—a main leg (18) extending substantially parallel to said middle plane (M), a loop (20) being provided at a radially outer end of said main leg (18), said second L-leg

(23) extending through said loop (20), said gripping faces being provided by said loop (20) and by said terminal leg (22).

10. A clutch unit as set forth in claim 9, said loop (20) having a terminal loop section (21), said first L-leg (19) and said terminal loop section (21) providing engagement faces limiting prestress-caused narrowing of said circular basic wire ring (12).

11. A clutch unit as set forth in claim 1 or 9 at least one of said clutch release ring member (34) and said wire clip unit (2) being provided with abutment means (15) for positioning said wire clip unit (2) with respect to said clutch release ring member (34) before inserting said clutch release sleeve member (50) into said clutch release ring member (34).

12. A clutch unit as set forth in claim 1 or 9, said clutch release sleeve member (50) being provided with a conical introduction face (32) widening said circular basic wire ring (3) when introducing said clutch release sleeve member (50) into said clutch release ring member (34).

13. A clutch unit as set forth in claim 12, the smaller end of said conical introduction face (32) being smaller or equal in diameter as compared with the inner diameter of said circular basic wire ring (3) before said clutch release sleeve member (50) is introduced into said circular basic wire ring (3).

* * * * *

UNITED STATES PATENT AND TRADEMARK OFFICE
CERTIFICATE OF CORRECTION

PATENT NO. : 4,909,370

DATED : March 20, 1990

INVENTOR(S) : Bernhard Limbacher et al.

It is certified that error appears in the above-identified patent and that said Letters Patent is hereby corrected as shown below:

Col. 7, line 4, "32" should read --(3)--;
Col. 7, line 19, delete "spring";
Col. 7, line 54, after "each" insert --other.--;
Col. 7, line 55, after "said" insert --main--;
Col. 7, line 57, after "outward" insert --direction.--;
Col. 8, line 53, "en" should read --end--.

Signed and Sealed this

Second Day of July, 1991

Attest:

HARRY F. MANBECK, JR.

Attesting Officer

Commissioner of Patents and Trademarks